(12) United States Patent
Niv et al.

(10) Patent No.: US 6,353,523 B1
(45) Date of Patent: Mar. 5, 2002

(54) HOT-SWAP PROTECTION CIRCUITRY

(75) Inventors: Nehemia Niv, Petach Tikva; Haim Neerman, Hadera, both of (IL)

(73) Assignee: Actil LTD, Tel Aviv (IL)

( * ) Notice: Subject to any disclaimer, the term of this patent is extended or adjusted under 35 U.S.C. 154(b) by 0 days.

(21) Appl. No.: 09/330,296

(22) Filed: Jun. 11, 1999

(51) Int. Cl.⁷ ............................................... H02H 3/18
(52) U.S. Cl. ........................... 361/79; 361/58; 710/103
(58) Field of Search ........................... 361/79, 86, 87, 361/58; 710/100–103

(56) References Cited

U.S. PATENT DOCUMENTS

| | | | |
|---|---|---|---|
| 5,317,697 A | 5/1994 | Husak et al. | ............... 395/325 |
| 5,530,302 A | 6/1996 | Hamre et al. | ............... 307/147 |
| 5,951,660 A * | 9/1999 | Van Wonterghem | ........ 710/103 |
| 5,973,419 A * | 10/1999 | Kruppa et al. | ............... 307/131 |
| 5,996,035 A * | 11/1999 | Allen et al. | ................. 710/103 |

* cited by examiner

Primary Examiner—Michael J. Sherry
(74) Attorney, Agent, or Firm—Abelman, Frayne & Schwab

(57) ABSTRACT

This invention discloses an electronic hot-swap protection circuit for enabling hot swap connections and disconnections, the circuit includes a detector for detecting electrical current or voltage along a conductor which supplies power to a circuit to be protected during hot swap connections and disconnections, and a fast-disconnect, slow-reconnect switch connected in series with the detector and being operative in response to an output thereof, whereby the switch is relatively quickly opened when the absence of current is detected while the switch was closed and the switch is relatively slowly closed when voltage is detected following opening of the switch.

28 Claims, 8 Drawing Sheets

US 6,353,523 B1

HOT-SWAP PROTECTION CIRCUITRY

FIELD OF THE INVENTION

The present invention relates to hot-swap protection circuitry generally.

BACKGROUND OF THE INVENTION

Various types of hot-swap protection circuitry are known in the patent literature. The following U.S. Patents are believed to represent the state of the art: 5,530,302 & 5,317,697.

Hot-swap protection circuitry may be understood as including circuitry which enables electronic circuits to be connected to each other and disconnected from each other while under voltage. Hot-swap protection circuitry is required in many applications where it is not practical to shut-down an electronic system while replacing certain circuit boards thereof. Examples of such systems are telephone switches as well as computers. For example, the insertion and removal of PCMCIA cards is normally carried out under voltage, when the computer is turned on.

Conventional hot-swap protection circuits employ non-standard connectors which include at least one of an extra long pin and an extra-short pin, connected to voltage detectors, so that immediately upon connection and/or disconnection, the presence and/or the absence of voltage can be immediately sensed.

SUMMARY OF THE INVENTION

The present invention seeks to provide an improved hot-swap protection circuit which does not require the aforesaid non-standard connectors of the prior art.

There is thus provided in accordance with a preferred embodiment of the present invention an electronic hot-swap protection circuit for enabling hot swap connections and disconnections, the circuit including:

- a detector for detecting electrical current or voltage along a conductor which supplies power to a circuit to be protected during hot swap connections and disconnections; and
- a fast-disconnect, slow-reconnect switch connected in series with the detector and being operative in response to an output thereof, whereby the switch is relatively quickly opened when the absence of current is detected while the switch was closed and the switch is relatively slowly closed when voltage is detected following opening of the switch.

Preferably, the fast disconnect, slow-reconnect switch comprises a FET.

In accordance with a preferred embodiment of the present invention, the detector operates by sensing a polarity change.

Preferably, the detector operates by sensing a polarity change across the FET.

In accordance with a preferred embodiment of the present invention the detector is operative to provide a hot-swap occurrence indication to the circuit to be protected.

Preferably, the detector and the fast-disconnect, slow-reconnect switch also operate together as a low-pass filter.

In accordance with a preferred embodiment of the present invention, the low-pass filter has a voltage drop thereacross which is set by the detector.

Preferably, the detector comprises a control circuit.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1A:
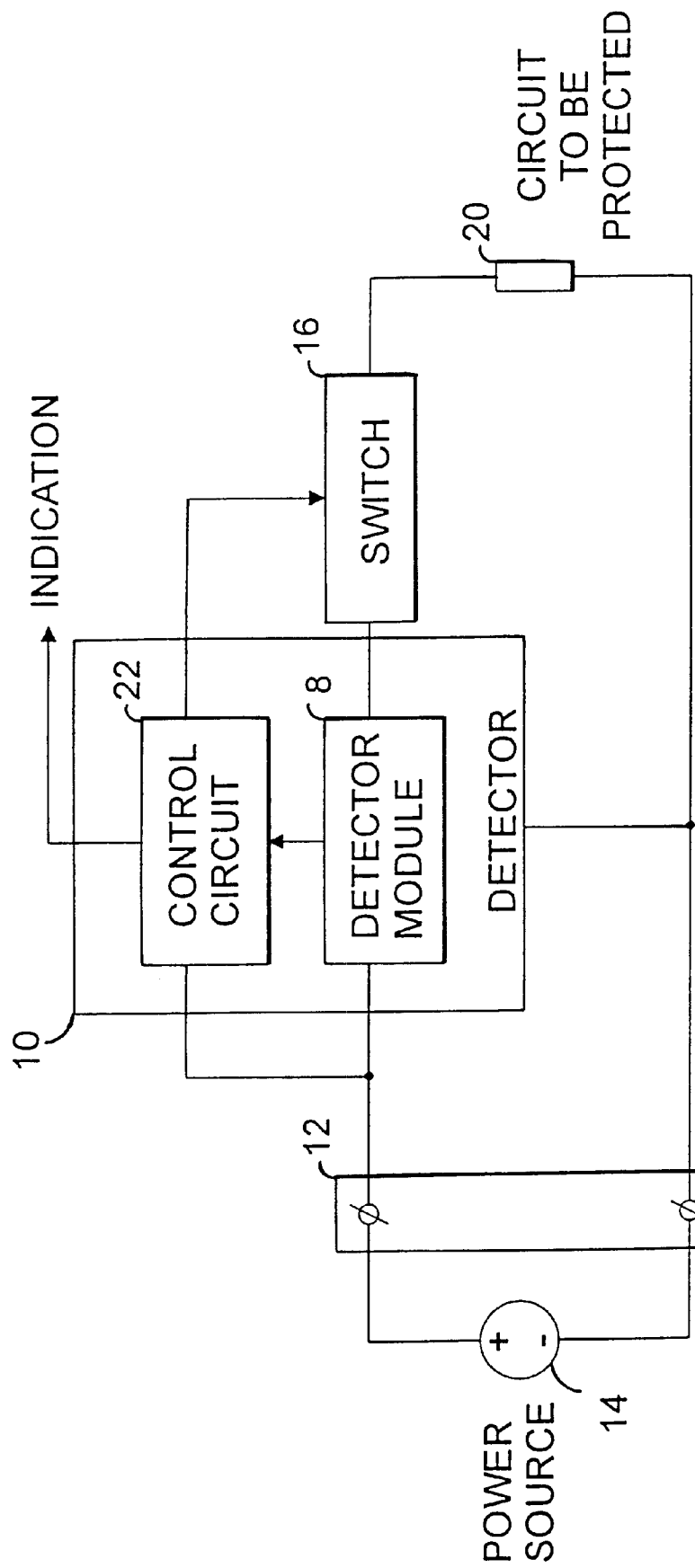
FIGS. 1A and 1B are simplified block diagram illustrations of two alternative embodiments of an electronic hot-swap protection circuit constructed and operative in accordance with the present invention.
Figure 1B:
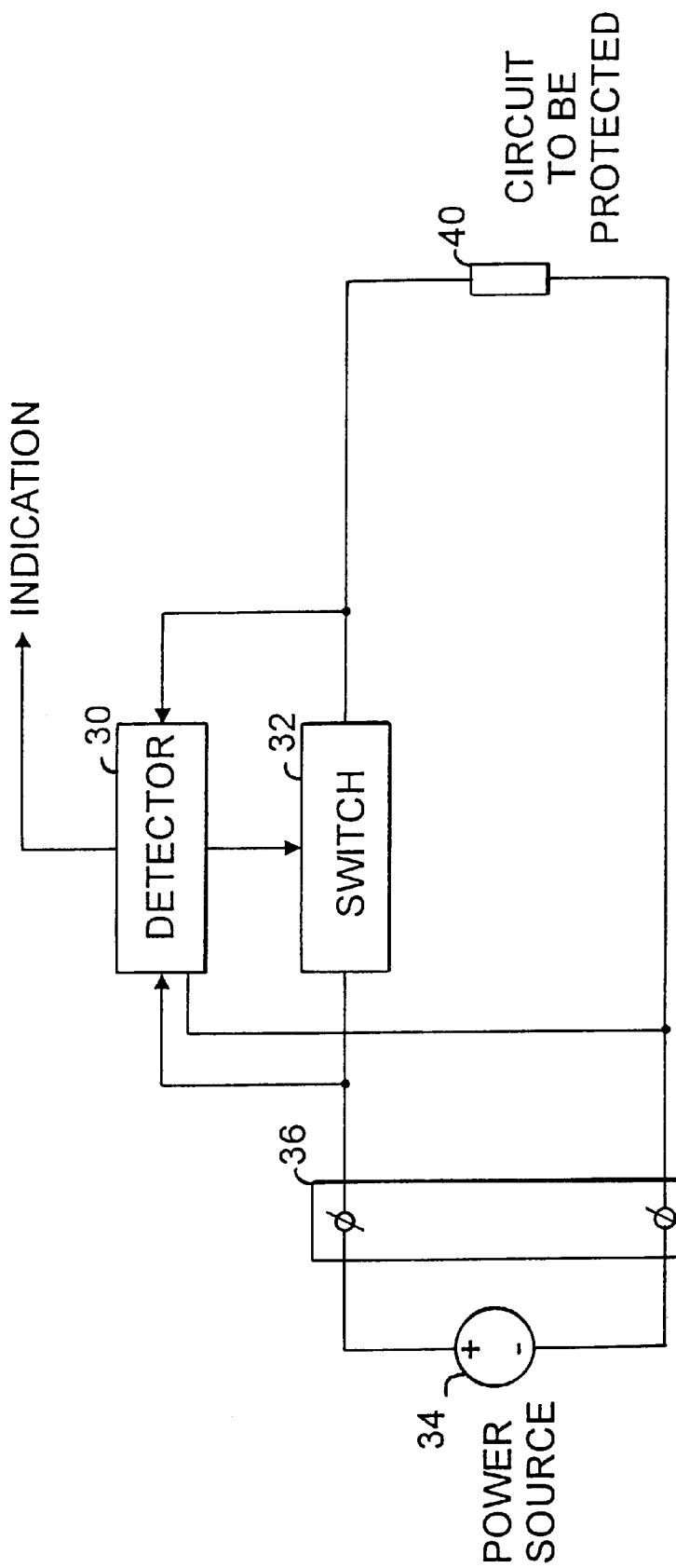

Reference is now made to FIGS. 1A and 1B, which are simplified block diagram illustrations of two alternative embodiments of an electronic hot-swap protection circuit constructed and operative in accordance with the present invention.

FIG. 1A illustrates a detector module 8 of a detector 10 connected in series, via a connector 12, between an electrical power source 14 and a fast-disconnect, slow-reconnect switch 16. Switch 16 is, in turn, connected in series along a power supply conductor to a circuit to be protected, designated by reference numeral 20. Switch 16 is to be understood as providing upon reconnection a non-binary state in the form of a continuously reduced resistance upon reconnection.

Upon detection of the presence of voltage following the absence of current or the detection of the absence of current following the presence of current, detector module 8 provides an output indication to a control circuit 22. Control circuit 22, upon receipt of the output indication of the presence of voltage following the absence of current, provides a control output to switch 16, causing switch 16 to relatively slowly close. Upon receipt of an output indication of the absence of current following the presence of current, control circuit 22 provides a control output to switch 16, causing switch 16 to relatively quickly open.

In accordance with a preferred embodiment of the present invention, the control circuit 22 is operative to provide a hot-swap occurrence indication to the circuit to be protected 20, upon detection of the presence of voltage following the absence of current or the detection of the absence of current following the presence of current.

FIG. 1B illustrates a detector 30 connected in parallel to a fast-disconnect, slow-reconnect switch 32. Switch 32 is, in turn, connected in series along a power supply conductor from a power source 34 via a connector 36 to a circuit to be protected, designated by reference numeral 40. Switch 32 is to be understood as providing upon reconnection a non-binary state in the form of a continuously reduced resistance upon reconnection.

Upon detection of the presence of voltage following the absence of current or the detection of the absence of current following the presence of current, detector 30 provides a hot-swap occurrence indication to the circuit to be protected 40.

Detector 30, upon detection of the presence of voltage following the absence of current, provides a control output to switch 32, causing switch 32 to relatively slowly close. Upon receipt of an output indication of the absence of current following the presence of current, detector 30 provides a control output to switch 32, causing switch 32 to relatively quickly open.

Figure 2A:
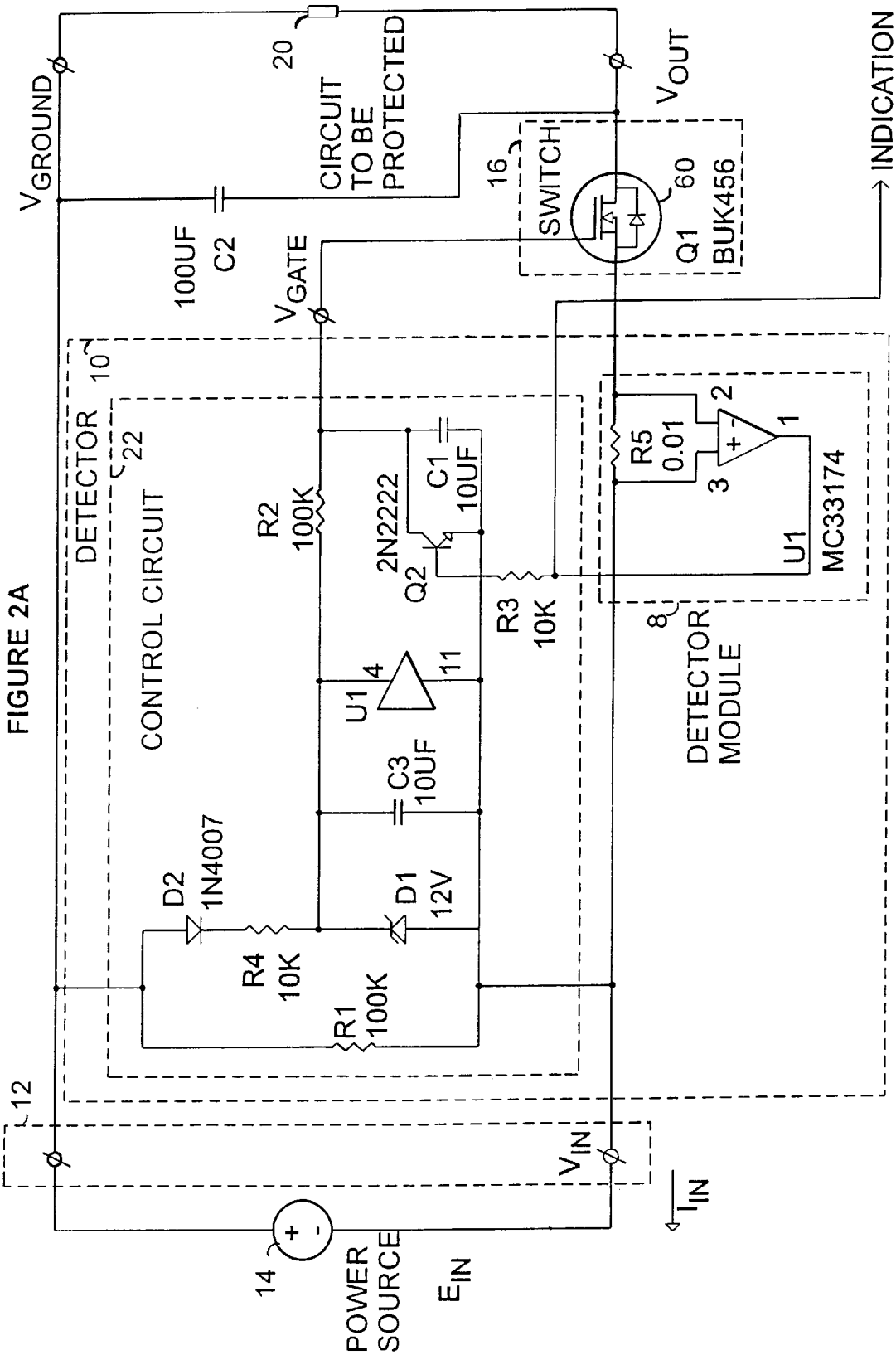
FIGS. 2A and 2B are circuit diagrams of preferred embodiments of the electronic hot-swap protection circuits of FIGS. 1A and 1B respectively.
Figure 2B:
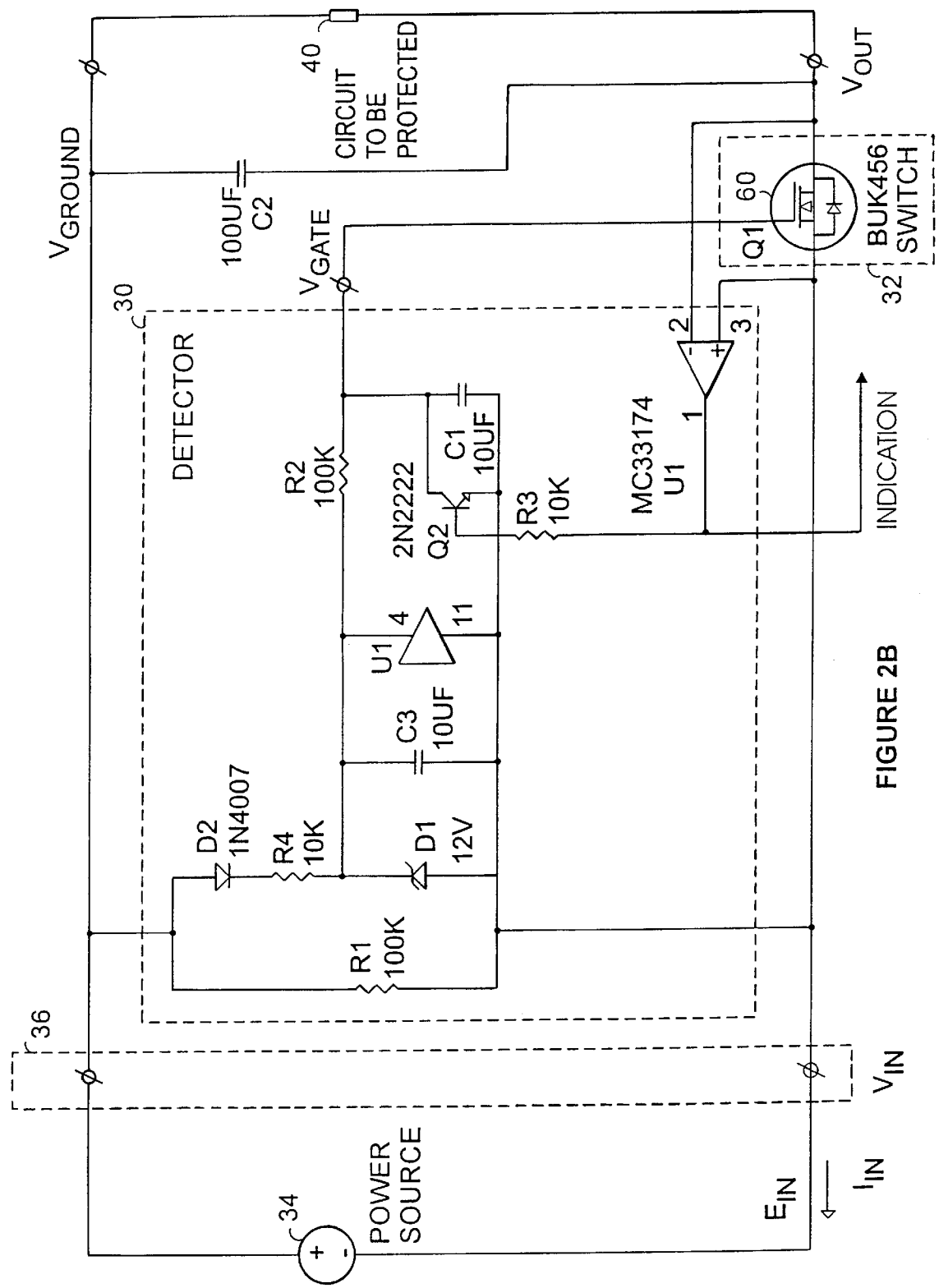

Reference is now made to FIGS. 2A and 2B, which are circuit diagrams of preferred embodiments of the electronic hot-swap protection circuits of FIGS. 1A and 1B respectively. FIGS. 2A and 2B illustrate the detector and switch on a negative polarity conductor, it being appreciated that alternatively, the detector and switch may be located on a positive polarity conductor, with appropriate modifications in the circuitry. The various elements of FIGS. 2A and 2B are indicated in dashed lines surrounding corresponding components in the circuitry of FIGS. 1A and 1B. Accordingly, FIGS. 2A and 2B are believed to be self-explanatory.

Figure 3A:
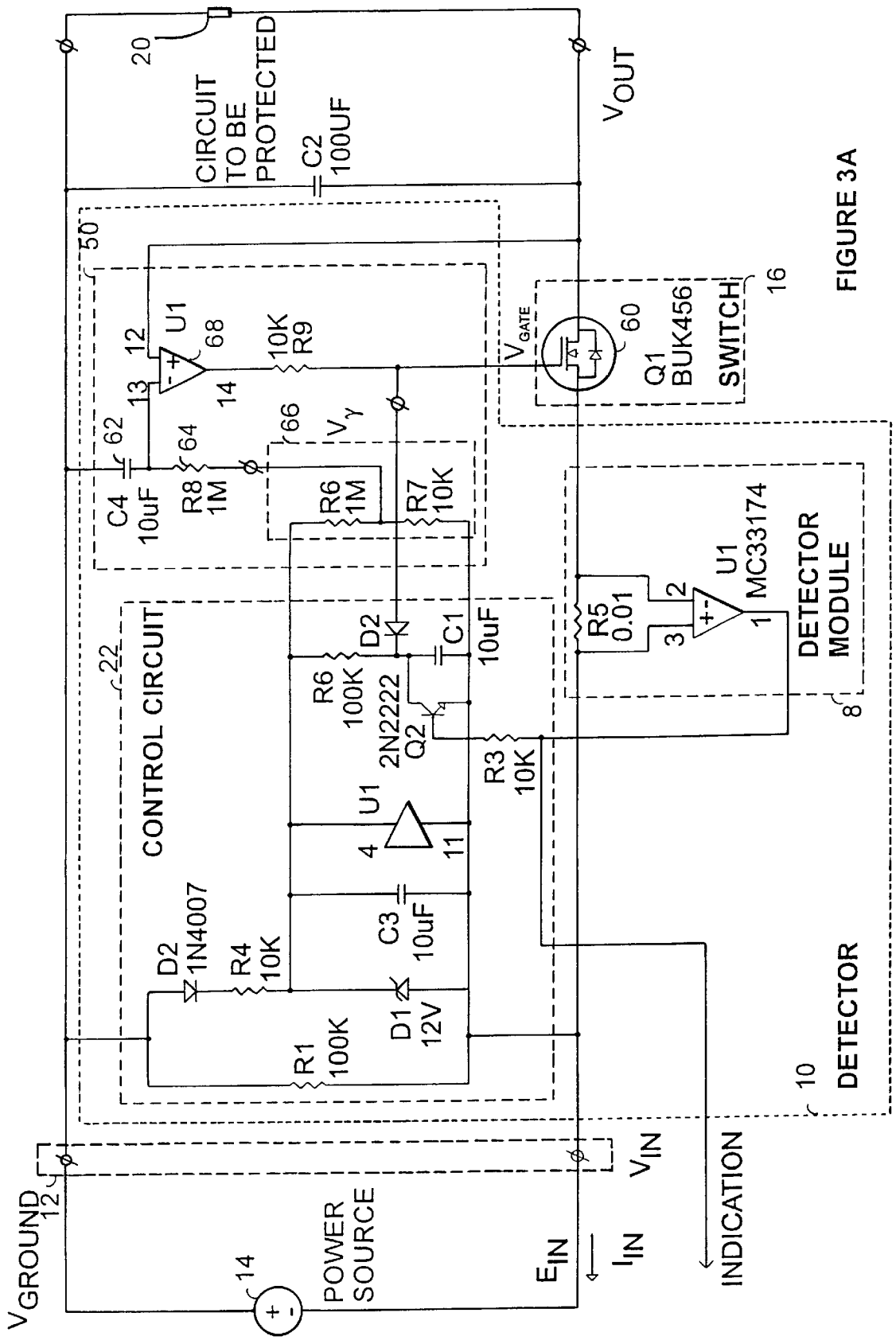
FIGS. 3A and 3B are circuit diagrams of preferred embodiments of the electronic hot-swap protection circuits of FIGS. 1A and 1B respectively including filter functionality.
Figure 3B:
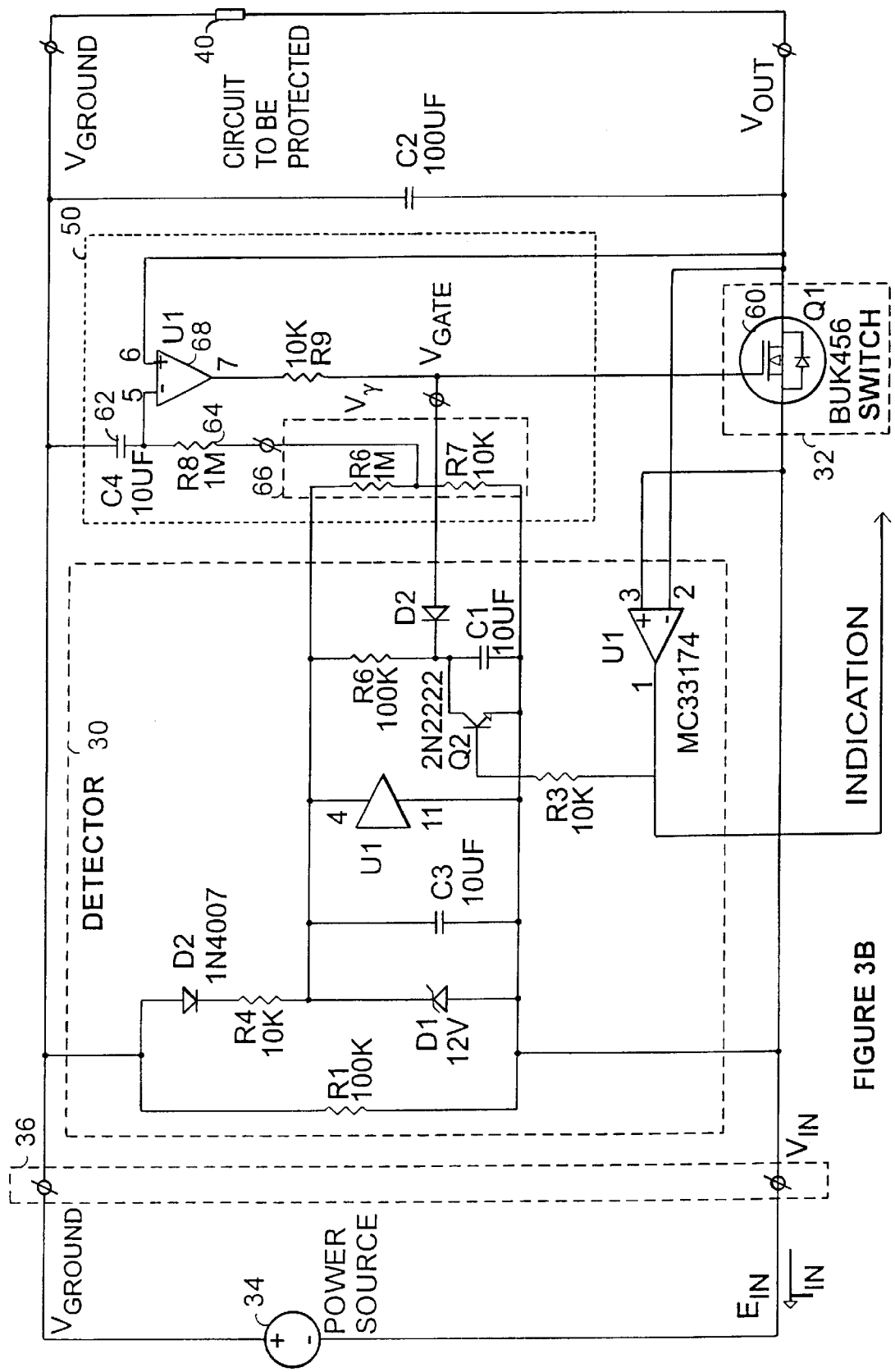

Reference is now made to FIGS. 3A and 3B, which are circuit diagrams of preferred embodiments of the electronic hot-swap protection circuits of FIGS. 1A and 1B respectively, including filter functionality. FIGS. 3A and 3B illustrate the detector and switch on a negative polarity conductor, it being appreciated that alternatively, the detector and switch may be located on a positive polarity conductor, with appropriate modifications in the circuitry. The various elements of FIGS. 1A and 1B are indicated in dashed lines surrounding corresponding components in the circuitry of FIGS. 3A and 3B. To this extent, FIGS. 3A and 3B are believed to be self-explanatory.

The circuits of FIGS. 3A and 3B each also include filter and driver circuitry, designated by reference numeral 50. The filter and driver circuitry 50 incorporates passive filter functionality which causes a FET 60 in the switch 16 (FIG. 1A) or 32 (FIG. 1B) to operate as a filter. More specifically, circuitry 50 includes a passive network including a capacitor 62 and a resistor 64 as well as a bias voltage source 66 and an operational amplifier 68, which cooperate to cause the FET 60 to operate as a voltage-regulated voltage source characterized by a transfer function determined by the transfer function of the passive network.

Reference is now made to FIGS. 4A, 4B, 4C and 4D, which are timing diagrams illustrating stages in hot-swap connection of current and voltage to a circuit to be protected in accordance with a preferred embodiment of the present invention.

Figure 4A:
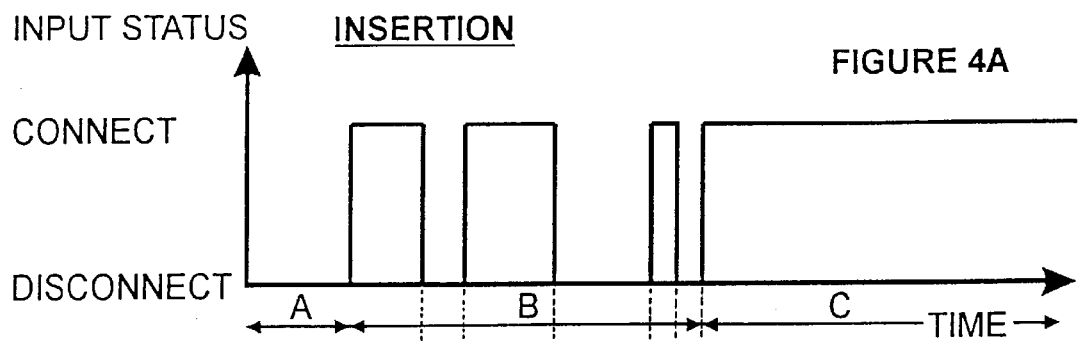
FIGS. 4A, 4B, 4C and 4D are timing diagrams illustrating stages in hot-swap connection of current and voltage to a circuit to be protected.

FIG. 4A illustrates the absence or presence of a galvanic connection between the power source 14 (FIG. 1A) or 34 (FIG. 1B) and the remainder of the circuitry of FIGS. 1A and 1B respectively. FIG. 4A illustrates that following an initial period A when no galvanic connection exists, there takes place an intermediate period B, when a galvanic connection exists intermittently, producing a state of "bouncing". Typically intermediate period B may take place over a time extending up to tens of milliseconds. Following intermediate period B, there exists a steady state galvanic connection condition, indicated as period C.

Figure 4B:
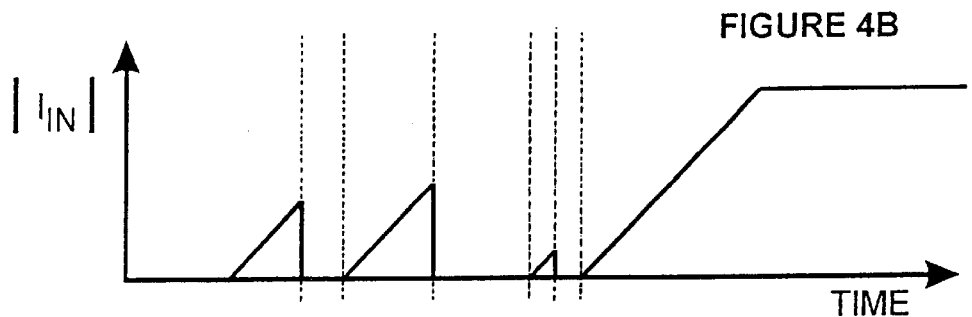

FIG. 4B, which is drawn on the same time scale as FIG. 4A, represents the input current drawn from the power source 14 (FIG. 1A) or 34 (FIG. 1B). It is seen that the current repeatedly rises from a zero level.

Figure 4C:
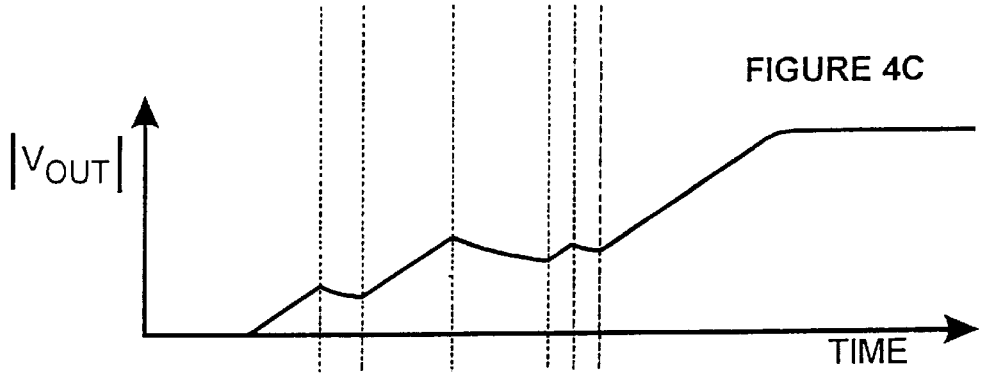

FIG. 4C, which is drawn on the same time scale as FIGS. 4A & 4B, represents the input voltage supplied to the circuit to be protected 20 (FIG. 1A) or 40 (FIG. 1B). It is seen that the voltage rises from a zero level in a non-monotonic manner to a final steady state voltage level following the beginning of period C.

Figure 4D:
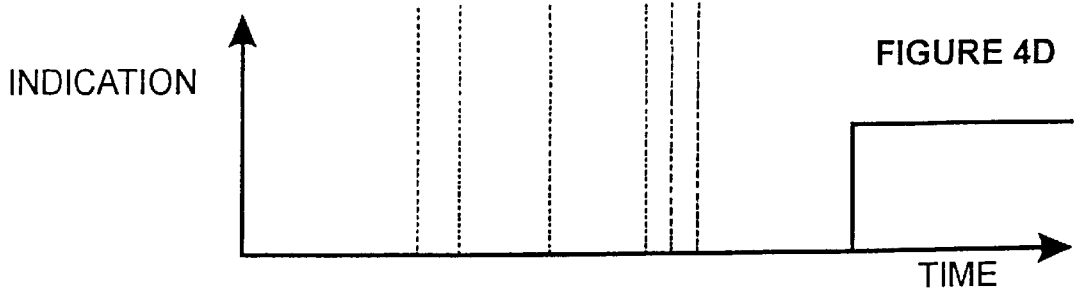

FIG. 4D, which is drawn on the same time scale as FIGS. 4A, 4B & 4C, represents the hot-swap occurrence indication produced by the control circuit 22 of detector 10 (FIG. 1A) or detector 30 (FIG. 1B). The hot-swap occurrence indication indicates when the final steady state voltage level has been reached.

Reference is now made to FIGS. 5A, 5B, 5C and 5D, which are timing diagrams illustrating stages in hot-swap disconnection of current and voltage from a circuit to be protected.

Figure 5A:
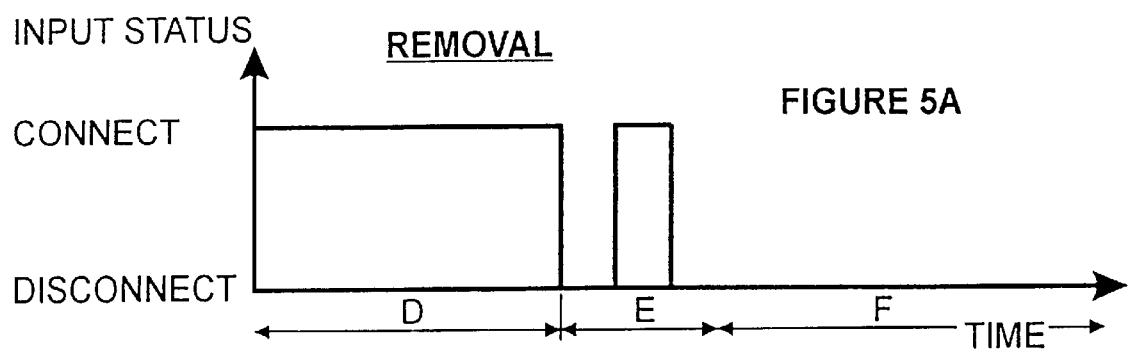
FIGS. 5A, 5B, 5C and 5D are timing diagrams illustrating stages in hot-swap disconnection of current and voltage from a circuit to be protected.

FIG. 5A illustrates the presence or absence of a galvenic connection between the power source 14 (FIG. 1A) or 34 (FIG. 1B) and the remainder of the circuitry of FIGS. 1A and 1B respectively. FIG. 5A illustrates that following an initial period D when a steady state galvanic connection exists, there takes place an intermediate period E, when a galvanic connection exists intermittently, producing a state of "bouncing". Typically intermediate period E may take place over a time extending up to tens of milliseconds. Following intermediate period E, there exists a period of no galvanic connection, indicated as period F.

Figure 5B:
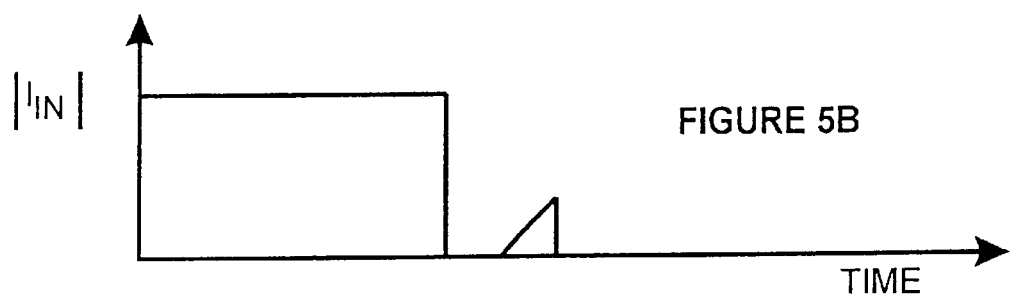

FIG. 5B, which is drawn on the same time scale as FIG. 5A, represents the input current drawn from the power source 14 (FIG. 1A) or 34 (FIG. 1B). It is seen that the current falls instantaneously from a steady state level to a zero level.

Figure 5C:

FIG. 5C, which is drawn on the same time scale as FIGS. 5A & 5B, represents the input voltage supplied to the circuit to be protected 20 (FIG. 1A) or 40 (FIG. 1B). It is seen that the voltage decreases from a steady state voltage level in a non-monotonic manner following the beginning of period E.

Figure 5D:
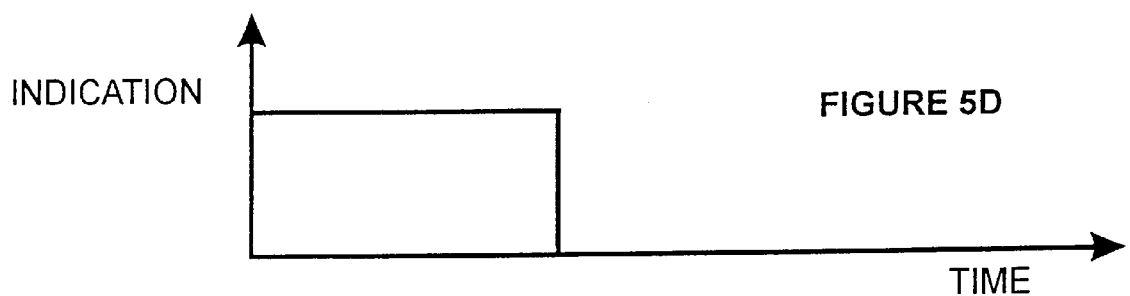

FIG. 5D, which is drawn on the same time scale as FIGS. 5A, 5B & 5C, represents the hot-swap occurrence indication produced by the control circuit 22 of detector 10 (FIG. 1A) or detector 30 (FIG. 1B). The hot-swap occurrence indication indicates when the circuit to be protected is disconnected from the power source.

It will be appreciated by persons skilled in the art that the present invention is not limited by what has been particularly shown and described hereinabove. The scope of the present invention includes both combinations and subcombinations of the various features described hereinabove as well as modifications and variations thereof which would occur to a person of ordinary skill in the art upon reading the foregoing description and which are not in the prior art.

What is claimed is:

1. An electronic hot-swap protection circuit for enabling hot swap connections and disconnections, the circuit comprising:

a detector for detecting electrical current or voltage along a conductor which supplies power to a circuit to be protected during hot swap connections and disconnections; and a fast-disconnect, slow-reconnect switch connected in series with said detector and being operative in response to an output thereof, whereby said switch is relatively quickly opened when the absence of current is detected while the switch was closed and said switch is relatively slowly closed when voltage is detected following opening of said switch.

2. An electronic hot-swap protection circuit according to claim 1 and wherein said fast disconnect, slow-reconnect switch comprises a FET.

3. An electronic hot-swap protection circuit according to claim 1 and wherein said detector operates by sensing a polarity change.

4. An electronic hot-swap protection circuit according to claim 2 and wherein said detector operates by sensing a polarity change across said FET.

5. An electronic hot-swap protection circuit according to claim 1 and wherein said detector is operative to provide a hot-swap ocurrence indication to said circuit to be protected.

6. An electronic hot-swap protection circuit according to claim 2 and wherein said detector is operative to provide a hot-swap occurrence indication to said circuit to be protected.

7. An electronic hot-swap protection circuit according to claim 3 and wherein said detector is operative to provide a hot-swap occurrence indication to said circuit to be protected.

8. An electronic hot-swap protection circuit according to claim 4 and wherein said detector is operative to provide a hot-swap occurrence indication to said circuit to be protected.

9. An electronic hot-swap protection circuit according to claim 1 and wherein said detector and said fast-disconnect, slow-reconnect switch also operate together as a low-pass filter.

10. An electronic hot-swap protection circuit according to claim 2 and wherein said detector and said FET also operate together as a low-pass filter.

11. An electronic hot-swap protection circuit according to claim 3 and wherein said detector and said fast-disconnect, slow-reconnect switch also operate together as a low-pass filter.

12. An electronic hot-swap protection circuit according to claim 4 and wherein said detector and said FET also operate together as a low-pass filter.

13. An electronic hot-swap protection circuit according to claim 5 and wherein said detector and said fast-disconnect, slow-reconnect switch also operate together as a low-pass filter.

14. An electronic hot-swap protection circuit according to claim 6 and wherein said detector and said FET also operate together as a low-pass filter.

15. An electronic hot-swap protection circuit according to claim 7 and wherein said detector and said fast-disconnect, slow-reconnect switch also operate together as a low-pass filter.

16. An electronic hot-swap protection circuit according to claim 8 and wherein said detector and said FET also operate together as a low-pass filter.

17. An electronic hot-swap protection circuit according to claim 1 and wherein said detector comprises a control circuit.

18. An electronic hot-swap protection circuit according to claim 2 and wherein said detector comprises a control circuit.

19. An electronic hot-swap protection circuit according to claim 3 and wherein said detector comprises a control circuit.

20. An electronic hot-swap protection circuit according to claim 4 and wherein said detector comprises a control circuit.

21. An electronic hot-swap protection circuit according to claim 9 and wherein said low-pass filter has a voltage drop thereacross which is set by said detector.

22. An electronic hot-swap protection circuit according to claim 10 and wherein said FET has a voltage drop thereacross which is set by said detector.

23. An electronic hot-swap protection circuit according to claim 11 and wherein said low-pass filter has a voltage drop thereacross which is set by said detector.

24. An electronic hot-swap protection circuit according to claim 12 and wherein said FET has a voltage drop thereacross which is set by said detector.

25. An electronic hot-swap protection circuit according to claim 13 and wherein said low-pass filter has a voltage drop thereacross which is set by said detector.

26. An electronic hot-swap protection circuit according to claim 14 and wherein said FET has a voltage drop thereacross which is set by said detector.

27. An electronic hot-swap protection circuit according to claim 15 and wherein said low-pass filter has a voltage drop thereacross which is set by said detector.

28. An electronic hot-swap protection circuit according to claim 16 and wherein said FET has a voltage drop thereacross which set by said detector.

* * * * *